United States Patent
Hebert et al.

(10) Patent No.: US 10,789,159 B2
(45) Date of Patent: Sep. 29, 2020

(54) NON-REGRESSIVE INJECTION OF DECEPTION DECOYS

(71) Applicant: SAP SE, Walldorf (DE)

(72) Inventors: Cedric Hebert, Mougins (FR); Henrik Plate, Valbonne (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/211,126

(22) Filed: Dec. 5, 2018

(65) Prior Publication Data

US 2020/0183820 A1 Jun. 11, 2020

(51) Int. Cl.

| | |
|---|---|
| *G06F 11/36* | (2006.01) |
| *G06F 9/44* | (2018.01) |
| *G06F 11/00* | (2006.01) |
| *G06F 21/14* | (2013.01) |
| *G06F 8/30* | (2018.01) |
| *G06F 21/54* | (2013.01) |
| *G06F 8/10* | (2018.01) |
| *G06F 8/20* | (2018.01) |
| *G06F 21/55* | (2013.01) |

(52) U.S. Cl.
CPC ......... *G06F 11/3692* (2013.01); *G06F 8/10* (2013.01); *G06F 8/30* (2013.01); *G06F 11/3664* (2013.01); *G06F 11/3672* (2013.01); *G06F 11/3684* (2013.01); *G06F 11/3688* (2013.01); *G06F 21/54* (2013.01); *G06F 8/20* (2013.01); *G06F 21/554* (2013.01)

(58) Field of Classification Search
CPC ......... G06F 11/3688; G06F 11/3672; G06F 11/3664; G06F 11/3684; G06F 8/20; G06F 8/10; G06F 9/5038; G06F 9/451; G06F 11/3692; G06F 8/30; G06F 21/54; G06F 21/554; G06F 21/14; H04L 63/1416; H04L 63/0823; H04L 63/1466; H04L 63/0428; H04L 63/1441
See application file for complete search history.

(56) References Cited

U.S. PATENT DOCUMENTS

| | | | |
|---|---|---|---|
| 6,502,102 B1 * | 12/2002 | Haswell | G06F 11/3664 |
| 7,100,195 B1 * | 8/2006 | Underwood | G06F 9/451 |
| | | | 726/2 |
| 7,289,964 B1 * | 10/2007 | Bowman-Amuah | |
| | | | G06F 9/5038 |
| | | | 705/1.1 |

(Continued)

OTHER PUBLICATIONS

Milad Nasr et al., Optimal Decoy Routing Through Game Theory, Oct. 24-28, 2016, [Retrieved on May 20, 2020]. Retrieved from the internet: <URL: https://dl.acm.org/doi/pdf/10.1145/2976749.2978367> 12 Pages (1727-1738) (Year: 2016).*

(Continued)

*Primary Examiner* — Anibal Rivera
(74) *Attorney, Agent, or Firm* — Mintz Levin Cohn Ferris Glovsky and Popeo, P.C.

(57) ABSTRACT

Systems and methods, as well as computing architecture for implementing the same, for decoy injection into an application. The systems and methods include splitting a standard test phase operation into two complementary phases, and add new unit tests to the process, dedicated to testing the proper coverage of the decoys and avoiding non-regression of the original code.

21 Claims, 4 Drawing Sheets

(56) References Cited

U.S. PATENT DOCUMENTS

| | | | | |
|---|---|---|---|---|
| 7,689,398 B2* | 3/2010 | Cheng | A61C 7/00 |
| | | | 433/24 |
| 7,849,438 B1* | 12/2010 | Hemmat | G06Q 10/06 |
| | | | 717/102 |
| 8,069,435 B1* | 11/2011 | Lai | G06Q 10/10 |
| | | | 717/106 |
| 8,191,044 B1* | 5/2012 | Berlik | G06F 11/3672 |
| | | | 717/102 |
| 8,346,929 B1* | 1/2013 | Lai | G06Q 10/10 |
| | | | 709/226 |
| 9,009,829 B2* | 4/2015 | Stolfo | G06F 21/554 |
| | | | 726/23 |
| 9,774,590 B1* | 9/2017 | Bronshtein | H04L 63/0823 |
| 10,318,412 B1* | 6/2019 | McKearney, Jr. | G06F 8/30 |
| 2004/0143811 A1* | 7/2004 | Kaelicke | G06Q 10/10 |
| | | | 717/101 |
| 2006/0010426 A1* | 1/2006 | Lewis | G06F 11/3684 |
| | | | 717/124 |
| 2010/0077483 A1* | 3/2010 | Stolfo | H04L 63/1466 |
| | | | 726/24 |
| 2012/0084866 A1* | 4/2012 | Stolfo | H04L 63/1416 |
| | | | 726/25 |
| 2014/0237599 A1* | 8/2014 | Gertner | H04L 63/1441 |
| | | | 726/24 |
| 2015/0101051 A1* | 4/2015 | Chamley | G06F 21/554 |
| | | | 726/23 |
| 2015/0347282 A1* | 12/2015 | Wingfors | G06F 11/3688 |
| | | | 717/125 |
| 2017/0070483 A1* | 3/2017 | Sammet | H04L 63/0428 |

OTHER PUBLICATIONS

James Bret Michael et al., Software Decoys: Intrusion Detection and Countermeasures, 2002, [Retrieved on May 20, 2020]. Retrieved from the internet: <URL: https://apps.dtic.mil/dtic/tr/fulltext/u2/a487425.pdf> 9 Pages (1-9) (Year: 2002).*

* cited by examiner

NON-REGRESSIVE INJECTION OF DECEPTION DECOYS

TECHNICAL FIELD

The subject matter described herein relates to a system and method for injecting decoys into application code using novel techniques that do not alter expected application behavior.

BACKGROUND

Decoys are deceptive tokens, code or data that are inserted into applications for luring an attacker of the application code. Decoys can take the form of honeytokens, such as fictitious words or records that are added to legitimate databases, or ghost entries, for example. These elements are added to the application one wants to protect, with the rationale that only attackers will search for them. The decoys are monitored, so as soon as an attacker reaches such a token, their presence is revealed to the application owner.

Planting decoys into applications can be an effective means to detect the presence of an attacker and a first step towards taking defensive actions. Systems for weaving extra decoy code into existing application code can exist in numerous forms. Some technologies, such as a C preprocessor to Aspect-Oriented Programming, while not originally developed for planting decoys, can be used to this end. However, the best practices when developing with such techniques rely on testing only the completed application and do not consider possible regressions caused by adding the extra decoy code However, the placement of decoys in application code adds a burden on the the developers. Adding them to the application creates extra work in development and in testing, and can lead to unwanted side effects such as the decoy being triggered during normal operations, or the decoy code breaking the normal execution flow.

SUMMARY

This document presents a system and method, and exemplary architecture implementing the same, for decoy injection into an application. The system and method include splitting a standard test phase operation into two complementary phases, and add new unit tests to the process, dedicated to testing the proper coverage of the decoys and avoiding non-regression of the original code.

Accordingly, the systems and techniques described herein provide mechanisms for injecting decoys into application code without adding side effects, and for automating testing of such additions to the original application code. Such mechanisms introduce decoys seamlessly, and enable self-defending of the application by allowing developers to include relevant decoys that blend in with the application so as to not tip-off an attacker of the application to the nature of the decoys, as well as help protect resources identified by the developer as sensitive.

In some aspects, a method, system and computer program product include the steps of receiving, by an application development environment, functional requirements for an application. The steps include generating, by the application development environment, application code for the application based on the functional requirements, the application code being configured to execute one or more application functions. The steps further include receiving, by a weaving engine, decoy code representing one or more decoy data or functions, and inserting, by the weaving engine, the decoy code into the application with the application code to produce modified source code. The steps further include generating, by a test engine, one or more functional tests of the application code, generating, by the test engine, one or more decoy tests of the decoy code, and executing, by the test engine, the one or more functional tests and the one or more decoy tests of the decoy code. The steps further include comparing, by a verifier, results from the one or more functional tests and the one or more decoy tests to determine whether a regression exists in the application code by the inserting of the decoy code.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to defending application code from an attacker, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes systems and methods for seamlessly injecting one or more decoys into an application. Implementations of the current subject matter include splitting the standard test phase operation into two complementary phases, adding new unit tests to the operation that are dedicated to testing the proper coverage of the decoys and avoiding non-regression of the original application code. Accordingly, the systems and methods described herein do not add side effects, and enable automating testing of such additions to the original application code. Further, the systems and methods described herein allow for decoys inserted into an application to blend in with the application so as to not tip-off an attacker as to the nature of the decoys, as well as help protect resources identified by the developer as sensitive.

Figure 1:
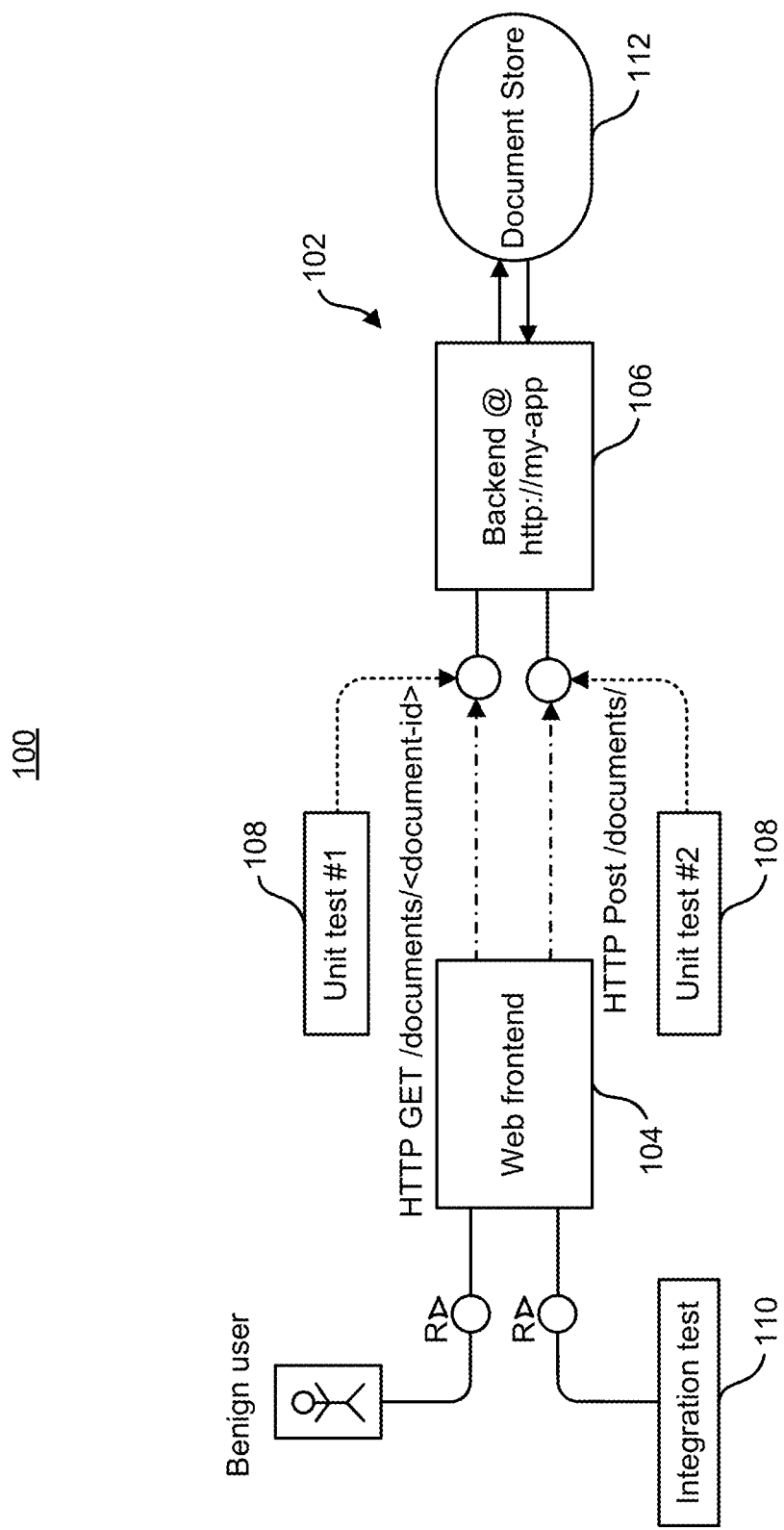
FIG. 1 is an architectural block diagram of a system providing an application.

An exemplary implementation of a system 100 is shown in FIG. 1. The system 100 includes an application 102 having a Web frontend 104 for allowing users to upload and retrieve documents, and which is implemented by interacting with a backend component 106 that exposes two corresponding interfaces, implemented as REST services as shown in Table 1 below.

TABLE 1

| REST services implemented by the developer | Description |
| --- | --- |
| HTTP POST http://my-app/documents/ | Upload a new document |
| HTTPGET http://my-app/documents/,documnet-id. | Retrieves the document with a given ID |

A developer of the application 102 test the correctness of application functionality using a set of functional tests, both for single components (so-called unit tests 108) and the entirety of the software system (so-called integration tests 110). In this example system 100, there exist unit tests #1 and #2 for document upload and retrieval targeting the above-mentioned REST services. An integration test 110 checks the functionality of the entire system (frontend 104, backend 106 and a document store 112) by simulating user behavior at the level of the frontend 104.

A threat model associated with the application 102 may suggest that potential attackers will check whether the backend 106 offers more REST services than the two used by the frontend 104. Typically, this is done by sending a series of HTTP requests, or "calls," to the backend 106 and observing its behavior. Table 2 below exemplifies three such potential calls, all of which are not foreseen (hence, not implemented) by the application developer.

To detect whether attackers can probe, or are probing, a productive instance of the application 102, one or more decoys can be added, manually or automatically, to the application code that forms the application 102. In an exemplary implementation, decoys can include three artificial REST services that just fulfill the purpose of detecting whether the application at hand is under attack. Note that REST services are just one example of decoy types, and that many other types of decoys can be used.

Figure 2:
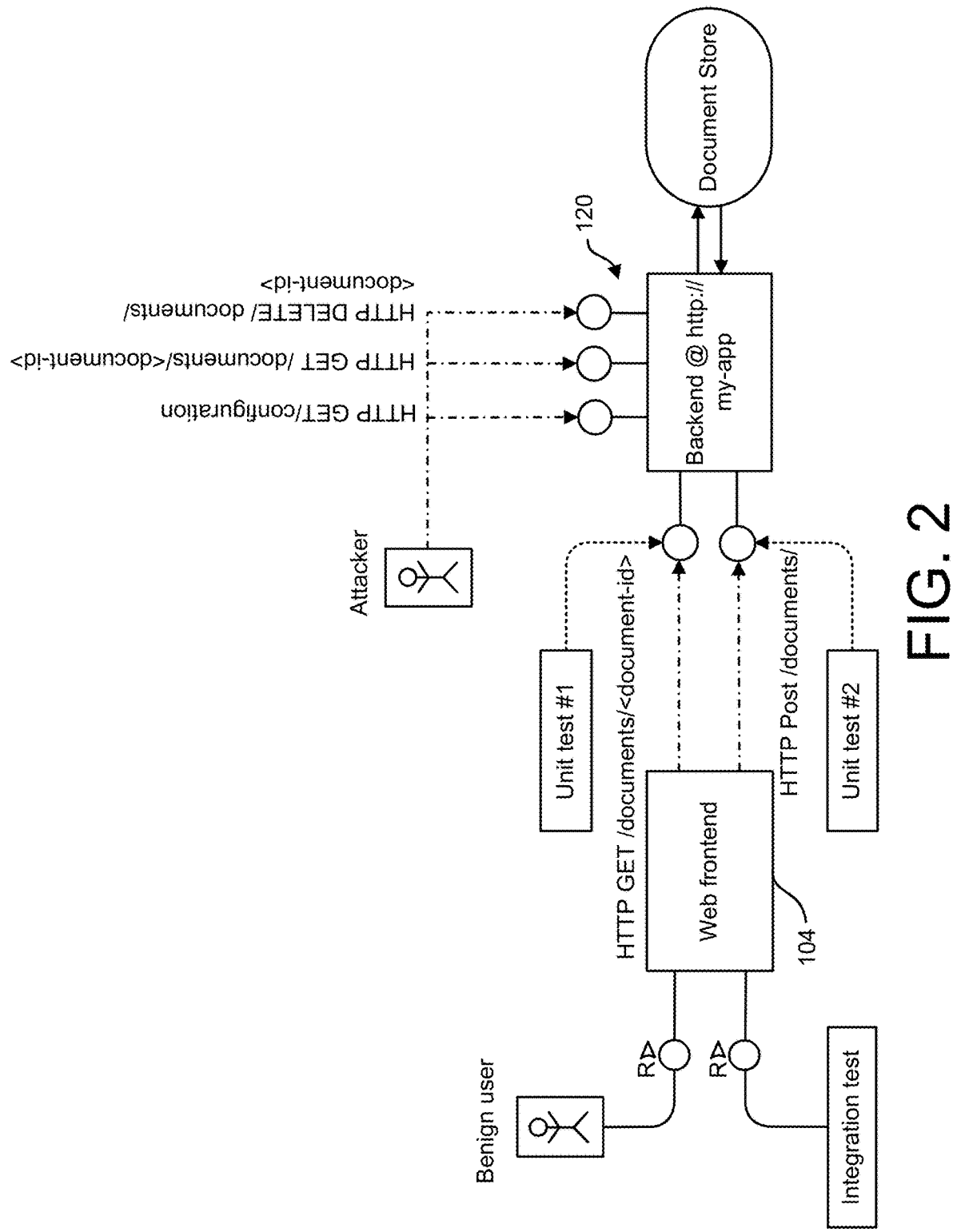
FIG. 2 is an architectural block diagram of the system with decoys added to the application code.

In some implementations consistent with the subject matter herein, if a decoy is triggered by an attacker, such access can be ensured to have happened outside of the regular application behavior since, in this example, a normal and regular use of the frontend 104 will only trigger the HTTP GET and POST services, and not the REST services provided by the decoy(s). As such, these calls can be attributed to an attacker probing the backend 106, as illustrated in FIG. 2, which shows three decoy REST services 120 and their direct invocation by an attacker.

However, adding decoys corresponds to modifying the application source code (or data), which comes with the risk of breaking the intended application functionality. As such, when adding decoys, one wants two ensure that the application functionality remains unmodified, that the decoys work, and that they do not accidentally trigger during normal operations of the application code. These properties can be tested respectively by comparing the results of functional tests before and after adding decoys by using so-called decoy tests, and by comparing test execution on the original code versus on the modified (i.e. with decoys added) code.

Figure 3:
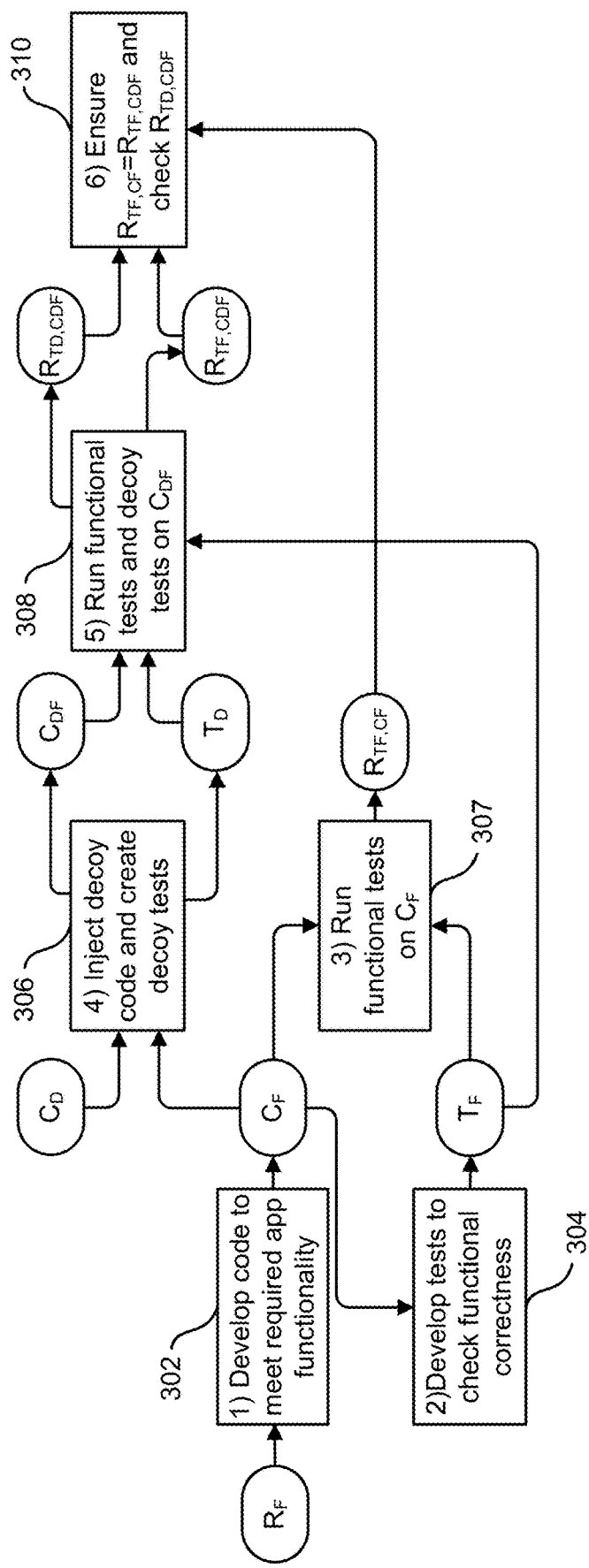
FIG. 3 illustrates a method of injecting decoys into an application, and for testing a functionality of both.

In accordance with some implementations, a method for adding one or more decoys to an application, and checking whether both the application and the decoys work as intended or expected, without modifying any functionality of the other, is depicted in FIG. 3, in which boxes represent manual or automated activities and ovals represent artifacts that can be stored as files, in a database or similar data store.

TABLE 2

| REST services tested by potential attackers | Description |
| --- | --- |
| HTTP PUT http://my-app/documents/,document-id>http://my-app/documents/<document-id> | Used by the attacker to check whether the document with a given ID can be updated/overwritten (a threat to information integrity) |
| HTTP DELETE http://my-app/documents/<document-id> | Used by the attacker to check whether the document with a give ID can be deleted (a threat to information availability) |
| HTTP GET http://my-app/configuration | Used by the attacker to check whether he can access the application configuration (Which is sensitive information) |

At least some or all of the activities and artifacts represented in FIG. 3 represent a method 300 to inject decoys into application code, and to check whether both application functionality and decoy functionality work as expected.

In more detail, the method 300 includes steps whereby functional requirements $R_F$, expressed for an application to be developed, are taken as input to develop code, at 302, to produce functional application code $C_F$. Following or in parallel, functional tests $T_F$ are developed at 304, to check whether $C_F$ works as expected, at 307. Execution of these functional tests $T_F$ using the functional code $C_F$ results in the production of a report $R_{TF,CF}$, which contains information about produced data, memory consumption, execution times or the like. This report can be enhanced with information about potential production of certain logs, such as corresponding to honeytokens having been accessed and/or triggered, for example.

At 306, decoy code $C_D$, such as to implement artificial REST services as described above for example, is added to functional application code $C_F$, and the modified source code of the application with the decoy code is stored as $C_{DF}$. At or about the same time, decoy tests $T_D$ are produced according to the decoys added, e.g., unit tests invoking the decoy REST services.

At 308, both the functional tests $T_F$ and the decoy tests $T_D$ are run on the modified source code $C_{DF}$. This results in separate reports $R_{TF,CDF}$ and $R_{TD,CDF}$. Finally, at 310, the results $R_{TF,CF}$, $R_{TF,CDF}$ and $R_{TD,CDF}$ are examined: If the information provided in $R_{TF,CF}$ and $R_{TF,CDF}$ is identical (or lies within one or more predefined ranges), one can assume that the addition of decoys did not result in regressions and thus, the application functionality as well as the performance has not been altered. If no honeytoken-related information is produced, one can be sure that the decoys do not accidentally trigger during normal operations. On the other hand, ff the results $R_{TD,CDF}$ indicate that all decoys have been triggered during the decoy tests $T_D$, one can assume that the decoys work as expected.

Figure 4:
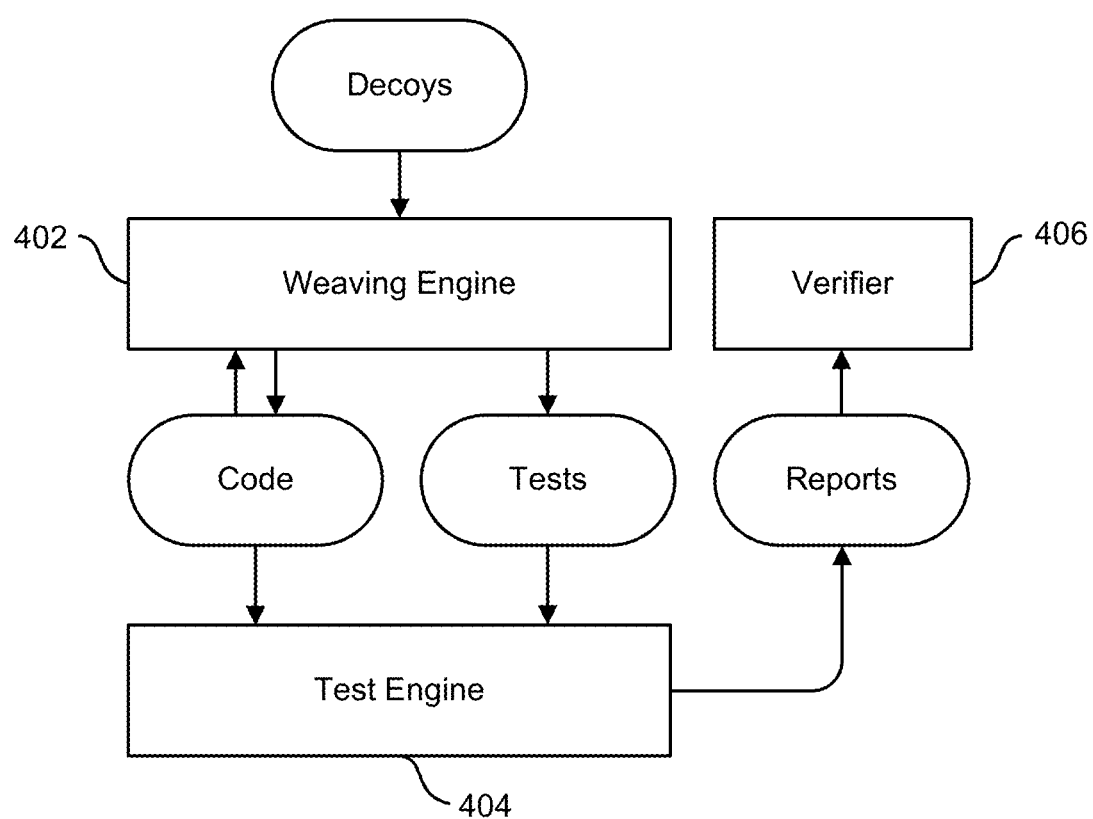
FIG. 4 illustrates a system for injecting decoys into an application, and for testing a functionality of both.

FIG. 4 illustrates a system 400 for injecting decoys into an application, and for testing a functionality of both, in accordance with implementations described herein. Some or all of the processors and storages can implement the methods described herein. Typically, an implementation aims at a seamless integration into the different phases of automated build processes (e.g., generate-sources, compile, pretest, test, verify) such that application developers face little to no development overhead. In some implementations, the system 400 includes a weaving engine 402, a test engine 404, and a verifier engine 406. Each of the weaving engine 402, test engine 404, and verifier engine 406 can be formed of one or more processors, or hardwired digital logic circuits responsive to executable software to execute their respective functions.

The weaving engine 402 injects decoy code into functional code of an application, and generates or produces decoy tests, as substantially described above with respect to FIG. 3. In some implementations, the weaving engine 402 relies on Aspect Oriented Programming (AOP). In other implementations, the weaving engine 402 can deploy the decoy as extra configuration files and executable code merged with the original application code.

The test engine 404 executes or performs the functional tests $T_F$ on the original, unmodified application code $C_F$, as well as executes or performs both the functional tests $T_F$ and decoy tests $T_D$ on the modified application code $C_{DF}$. Typically, the various tests can be implemented in such a way that standard test engines can be employed for test execution. For instance, in a Java environment, these could be JUnit tests executed by a Maven™ Surefire™ plugin as the test engine 404.

The verifier engine 406 performs verification of the various test reports, as described above with reference to FIG. 3. If the verifier engine 406 concludes as a result that injected decoys do not result in regressions (i.e. do not alter the application behavior as observed above), it completes the process with a success message. If the verifier engine 406 identifies an unacceptable deviation of the application behavior and/or the decoys cannot be triggered by its corresponding tests, the verifier engine 406 returns with an error. Such error can be used, for instance, to break the application build process.

The systems and methods described herein can be used to add protection to any application by introducing decoys as traps for luring attackers into revealing their presence, while ensuring that adding these decoys will neither cause the application to accidentally trigger one of the decoys nor will introduce regression to the application. These systems and methods provide a way to introduce the usage of decoys into the development life-cycle without adding unwanted side effects. While an exemplary implementation described above deals with enhanced with decoy REST services, the systems and methods can be applied to other types of decoys such as the addition of invisible UI elements (which can be seen only from the source code) or of other code-related artifacts.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
   receiving, by one or more processors of an application development environment, functional requirements for an application;
   generating, by the one or more processors, application code for the application based on the functional requirements, the application code being configured to execute one or more application functions;
   receiving, by a weaving engine of the application development environment, decoy code representing one or more decoy data and/or functions to detect invocation by an attacker;
   inserting, by the weaving engine, the decoy code into the application with the application code to produce modified source code;
   generating, by a test engine of the application development environment, one or more functional tests of the application code;
   generating, by the test engine, one or more decoy tests of the decoy code;
   executing, by the test engine, the one or more functional tests on the application code;
   executing, by the test engine, the one or more functional tests and the one or more decoy tests of the decoy code on the modified source code; and
   comparing, by a verifier of the application development environment, results from the one or more functional tests executed on the application code and the one or more decoy tests executed on the modified source code to determine whether a regression exists in the application code by the inserting of the decoy code.

2. The computer implemented method in accordance with claim 1, further comprising generating, by the verifier, a report of the results from the from the number of combinations of the one or more functional tests and the one or more decoy tests.

3. The computer implemented method in accordance with claim 1, wherein the comparing results from the number of combinations of the one or more functional tests and the one or more decoy tests further determines whether the decoy code of the modified source code is triggered.

4. The computer implemented method in accordance with claim 1, wherein the executing the one or more functional tests and the one or more decoy tests of the decoy code includes executing the one or more functional tests and the one or more decoy tests of the decoy code on the application code.

5. The computer implemented method in accordance with claim 1, wherein the executing the one or more functional tests and the one or more decoy tests of the decoy code includes executing the one or more functional tests and the one or more decoy tests of the decoy code on the modified source code.

6. The computer implemented method in accordance with claim 1, wherein the executing the one or more functional tests and the one or more decoy tests of the decoy code includes executing the one or more functional tests and the one or more decoy tests of the decoy code on the decoy code.

7. The computer implemented method in accordance with claim 1, wherein the executing the one or more functional tests and the one or more decoy tests of the decoy code includes executing the one or more functional tests and the one or more decoy tests of the decoy code on one or more of the application code, the modified source code, and the decoy code.

8. The computer implemented method of claim 1, wherein the decoy code is a lure to detect an attack of a system executing the application code.

9. A computer program product comprising a non-transitory machine-readable medium storing instructions that, when executed by at least one programmable processor, cause the at least one programmable processor to perform operations comprising:
 receiving, by one or more processors of an application development environment, functional requirements for an application;
 generating, by the one or more processors, application code for the application based on the functional requirements, the application code being configured to execute one or more application functions;
 receiving, by a weaving engine of the application development environment, decoy code representing one or more decoy data and/or functions to detect invocation by an attacker;
 inserting, by the weaving engine, the decoy code into the application with the application code to produce modified source code;
 generating, by a test engine of the application development environment, one or more functional tests of the application code;
 generating, by the test engine, one or more decoy tests of the decoy code;
 executing, by the test engine, the one or more functional tests on the application code;
 executing, by the test engine, the one or more functional tests and the one or more decoy tests of the decoy code on the modified source code; and
 comparing, by a verifier of the application development environment, results from the one or more functional tests executed on the application code and the one or more decoy tests executed on the modified source code to determine whether a regression exists in the application code by the inserting of the decoy code.

10. The computer program product in accordance with claim 9, wherein the operations further comprise generating a report of the results from the from the number of combinations of the one or more functional tests and the one or more decoy tests.

11. The computer program product in accordance with claim 9, wherein the comparing results from the number of combinations of the one or more functional tests and the one or more decoy tests further determines whether the decoy code of the modified source code is triggered.

12. The computer program product in accordance with claim 9, wherein the executing the one or more functional tests and the one or more decoy tests of the decoy code includes executing the one or more functional tests and the one or more decoy tests of the decoy code on the application code.

13. The computer program product in accordance with claim 9, wherein the executing the one or more functional tests and the one or more decoy tests of the decoy code includes executing the one or more functional tests and the one or more decoy tests of the decoy code on the modified source code.

14. The computer program product in accordance with claim 10, wherein the executing the one or more functional tests and the one or more decoy tests of the decoy code includes executing the one or more functional tests and the one or more decoy tests of the decoy code on the decoy code.

15. The computer program product in accordance with claim 11, wherein the executing the one or more functional tests and the one or more decoy tests of the decoy code includes executing the one or more functional tests and the one or more decoy tests of the decoy code on one or more of the application code, the modified source code, and the decoy code.

16. A system comprising:
 one or more programmable processors forming an application development environment comprising a weaving engine, a test engine, and a verifier; and
 a machine-readable medium storing instructions that, when executed by the one or more programmable processors, cause the one or more programmable processors to perform operations comprising:
  receiving, by one or more processors of an application development environment, functional requirements for an application;
  generating, by the one or more processors, application code for the application based on the functional requirements, the application code being configured to execute one or more application functions;
  receiving, by a weaving engine of the application development environment, decoy code representing one or more decoy data and/or functions to detect invocation by an attacker;
  inserting, by the weaving engine, the decoy code into the application with the application code to produce modified source code;
  generating, by a test engine of the application development environment, one or more functional tests of the application code;
  generating, by the test engine, one or more decoy tests of the decoy code;
  executing, by the test engine, the one or more functional tests on the application code;
  executing, by the test engine, the one or more functional tests and the one or more decoy tests of the decoy code on the modified source code; and
  comparing, by a verifier of the application development environment, results from the one or more functional tests executed on the application code and the one or more decoy tests executed on the modified source code to determine whether a regression exists in the application code by the inserting of the decoy code.

17. The computer program product in accordance with claim 16, wherein the comparing results from the number of combinations of the one or more functional tests and the one or more decoy tests further determines whether the decoy code of the modified source code is triggered.

18. The computer program product in accordance with claim 16, wherein the executing the one or more functional tests and the one or more decoy tests of the decoy code includes executing the one or more functional tests and the one or more decoy tests of the decoy code on the application code.

19. The computer program product in accordance with claim 16, wherein the executing the one or more functional tests and the one or more decoy tests of the decoy code includes executing the one or more functional tests and the one or more decoy tests of the decoy code on the modified source code.

20. The computer program product in accordance with claim 16, wherein the executing the one or more functional tests and the one or more decoy tests of the decoy code includes executing the one or more functional tests and the one or more decoy tests of the decoy code on the decoy code.

21. The computer program product in accordance with claim 16, wherein the executing the one or more functional tests and the one or more decoy tests of the decoy code includes executing the one or more functional tests and the one or more decoy tests of the decoy code on one or more of the application code, the modified source code, and the decoy code.

* * * * *